June 17, 1969   J. B. ZETZSCHE, JR   3,449,791
IRRIGATION PIPE
Filed June 20, 1966   Sheet 4 of 4
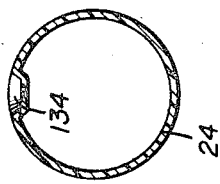
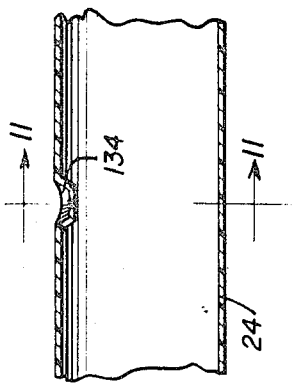
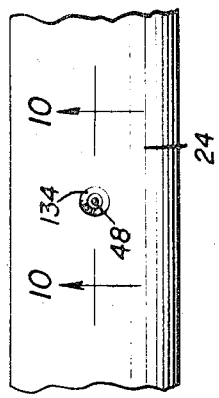
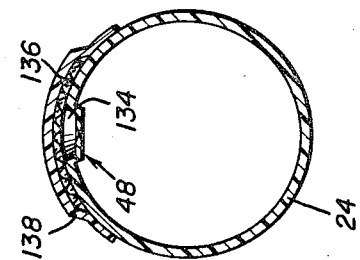
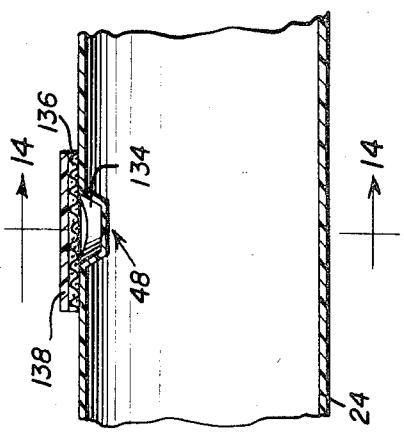
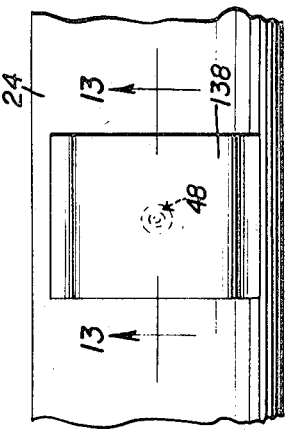
James B. Zetzsche, Jr.
INVENTOR.

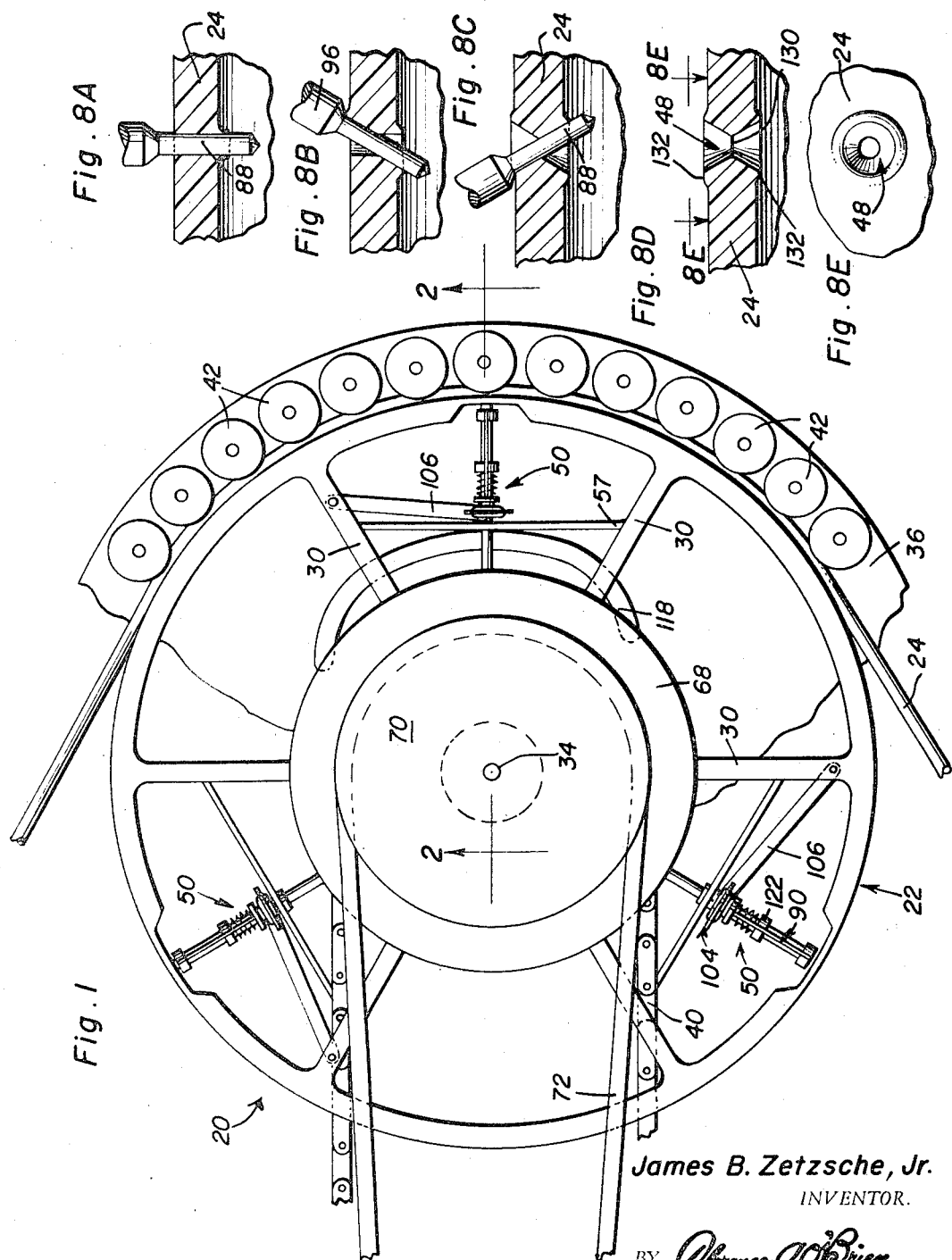

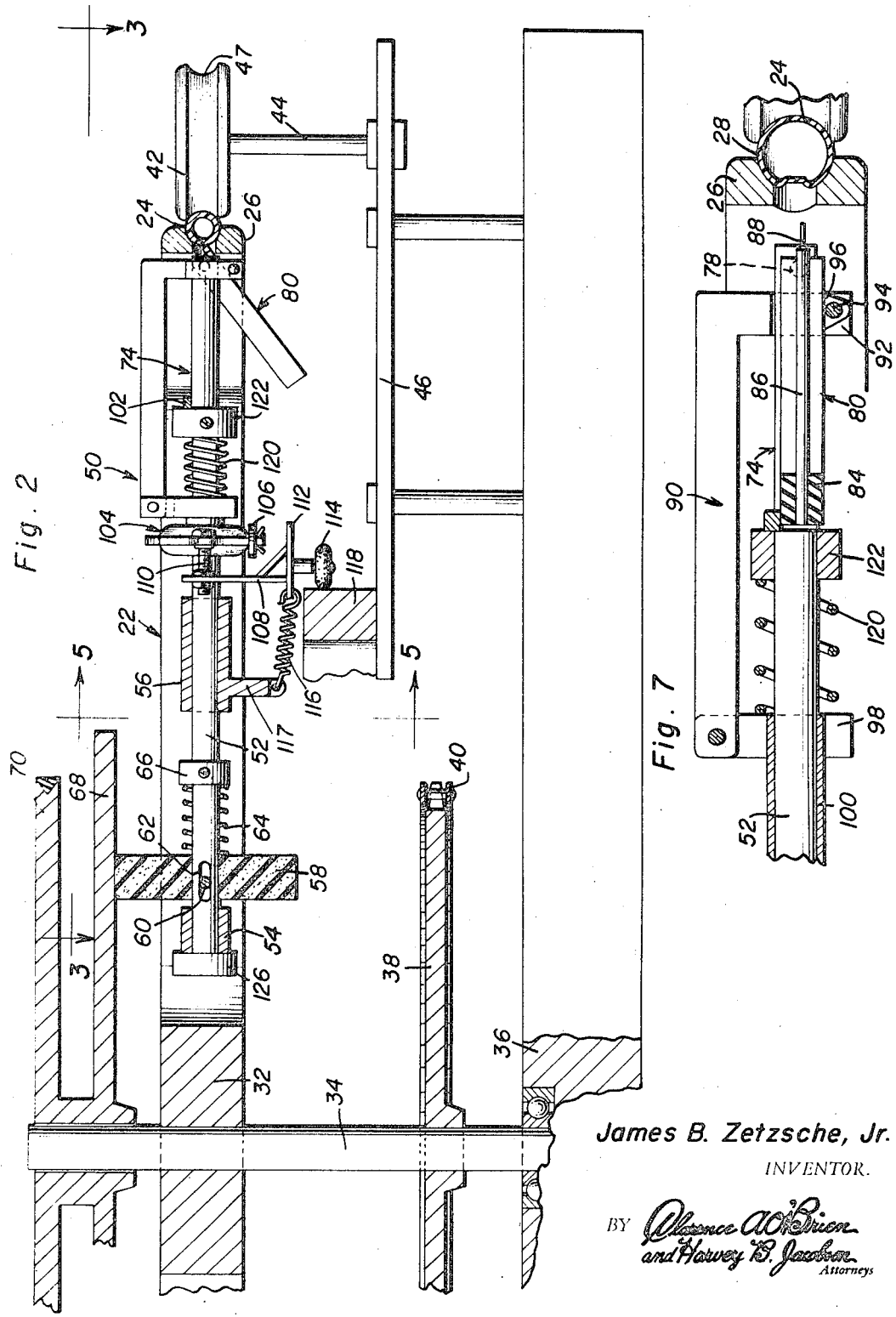

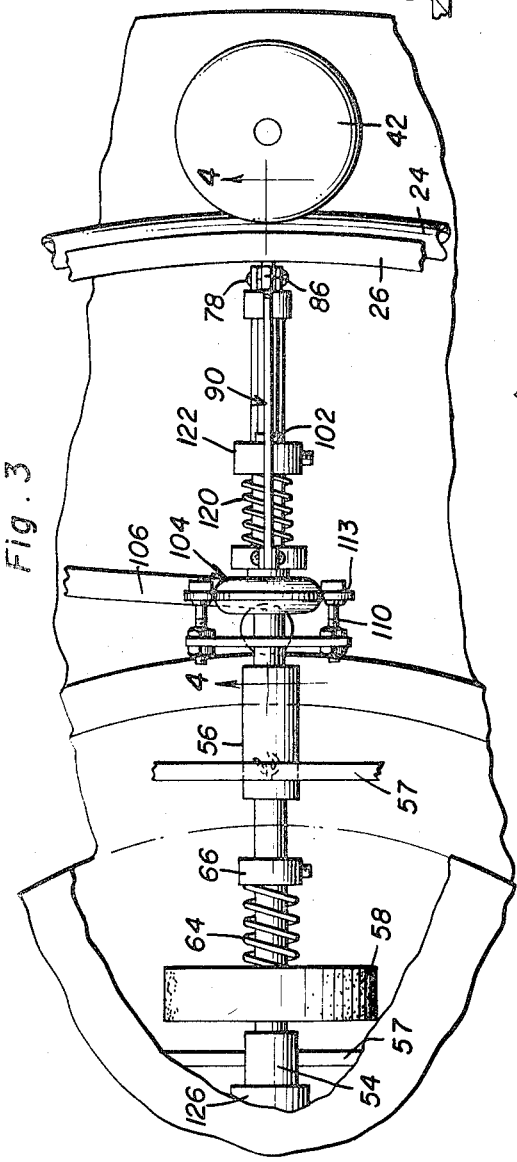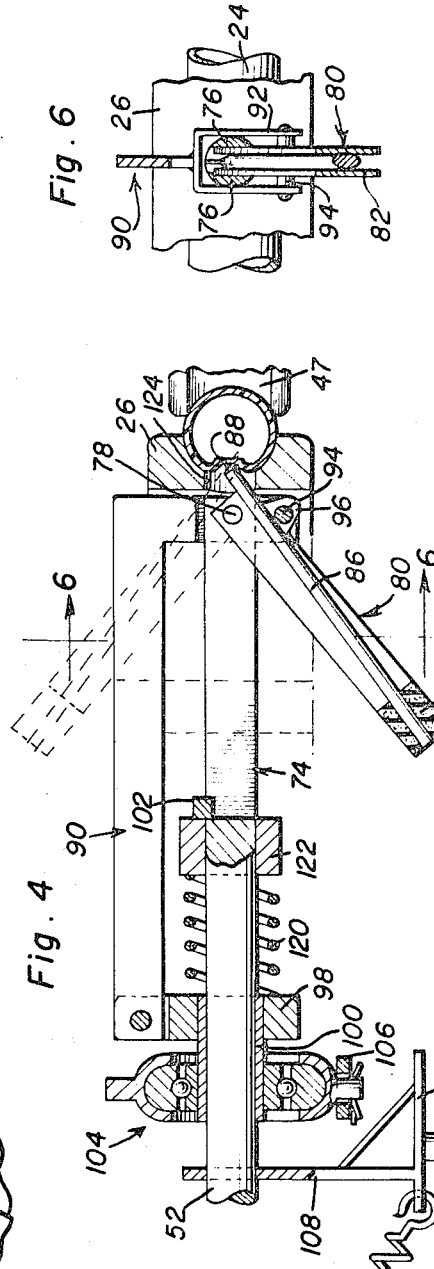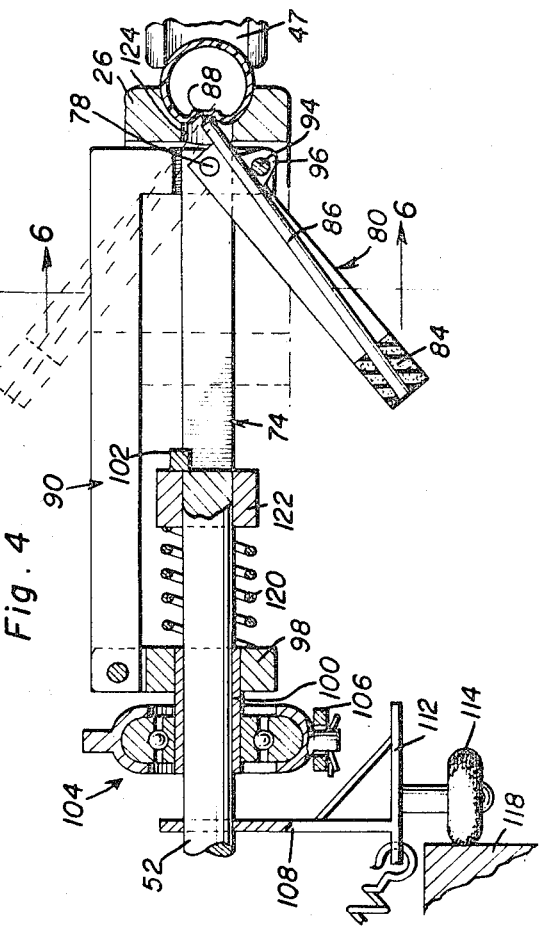

United States Patent Office 3,449,791
Patented June 17, 1969

3,449,791
IRRIGATION PIPE
James B. Zetzsche, Jr., Lubbock, Tex.
(1405 March, San Luis Obispo, Calif. 93401)
Filed June 20, 1966, Ser. No. 558,786
Int. Cl. B26f 1/00
U.S. Cl. 18—1                                    6 Claims

ABSTRACT OF THE DISCLOSURE

A continuously rotating enlarged annular carrier which receives pipe to be perforated about a portion of the circumference thereof. Perforating tools are mounted at equally spaced points about the carrier and are cam actuated for extending a pipe piercing tool through the near wall of a carried pipe and subsequently angling the tool at an angle to exceed the elastic limit of the pipe material, the tool continuously operating during this procedure and cold forming the pipe to define a hole with a conically shaped entrance and exit.

---

The instant invention is generally concerned with irrigation pipe of the type normally associated with subsurface irrigation. More particularly, the instant invention is concerned with the provision of irrigation pipe having uniform controlled size and shape liquid discharge orifices therein, along with a method and apparatus for effecting the formation of the orifices.

Heretofore many methods have been utilized in the provision of discharge holes within various types of irrigation pipes or sprinkler hoses, such methods involving, as an example, a straight punching of a needle-like member through the hose either alone or in combination with the application of heat. However, utilizing such conventional means results in jagged edges and in many instances small rips or tears in the pipe material. While such rips and tears are generally eliminated through the application of heat, this in turn produces unequal size orifices. In either instance there is an unequal discharge of water through the various orifices which affects the watering characteristics of the pipe in a manner which could conceivably destroy the effectiveness of the pipe through an improper watering of the soil, an unexpected pressure drop along the length of the pipe, or a further enlargement of the torn orifices themselves.

In order to avoid these defects, it is a primary object of the instant invention to provide a controlled size orifice within the wall of a pipe in a manner whereby each orifice in the pipe will be of the same size and shape as every other orifice, this being effected in conjunction with the provisions of a smooth formed and slightly reinforced surface about each orifice.

In conjunction with the above object, it is a significant object of the instant invention to provide equal size orifices wherein the control zone or most restricted area of the orifice occurs substantially midway between the opposite surfaces of the wall with the entry and exit being in the nature of converging smooth conical portions.

Further, it is a significant object of the instant invention that the orifices be formed by a cold rolling of the material in conjunction with a stressing of the material beyond its elastic limits so as to retain the rolled shape, this method being uniquely adapted for providing orifices of a controlled size within extremely thin material, one example being the contemplated use of this method in forming orifices having an internal diameter of .020" in a plastic wall having a thickness of .040".

It is also considered a significant object of the instant invention to incorporate protective means for each of the orifices in the finished pipe, such means, as an example, comprising the provision of an enlarged recess in the pipe surrounding each of the orifices either with or without a gauze-like covering therefor such as would exclude foreign matter while still allowing for the free seepage of water therethrough.

Furthermore, it is one of the primary objects of the instant invention to provide apparatus for automatically and continuously providing for the formation of the controlled size orifices within a length of pipe as the pipe is fed therethrough.

In conjunction with the above object, it is also considered an important object of the instant invention to provide orifice forming apparatus which is of a unique construction capable of repeatedly and periodically defining the desired shape and size orifice within a moving pipe in a relatively simple although positive manner.

Basically, the apparatus of the instant invention includes a continuously rotating enlarged sheave carrier which receives the pipe to be perforated about a portion of the circumference thereof, the pipe being maintained in position during the operation by a series of rotatable backup rollers or wheels. The sheave mounts, at equally spaced points thereabout, perforating tools, each of which is cam actuated as the held pipe is approached during the rotation of the sheave, for extending a pipe wall piercing needle-like tool through the near wall of the pipe and subsequently canting the material piercing tool at an angle which exceeds the elastic limit of the pipe material, polyethylene or the like, after which the piercing tool, which has been continuously rotating, proceeds to cold form the material of the pipe so as to define an inwardly directed conically shaped smooth entrance and exit through the pipe wall terminating in a centrally located cylindrical control zone of a diameter substantially equal to that of the cylindrical piercing tool itself. Finally, also through a cam control, the piercing tool is returned to its original position and retracted so as to free the pipe. It will of course be appreciated that the cold forming of the material provides for an exact size orifice having a smooth and reinforced wall such as will insure a positive and controlled discharge of water therethrough.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the operating portion of the apparatus;

FIGURE 2 is an enlarged partial cross-sectional view taken substantially on a plane passing along line 2—2 in FIGURE 1;

FIGURE 3 is a partial cross-sectional view taken substantially on a plane passing along line 3—3 in FIGURE 2;

FIGURE 4 is an enlarged partial cross-sectional view taken substantially on a plane passing along line 4—4 in FIGURE 3 and illustrating in detail the apparatus engaged with the pipe in the orifice rolling position;

FIGURE 5 is a cross-sectional detail taken substantially on a plane passing along line 5—5 in FIGURE 2;

FIGURE 6 is a cross-sectional detail taken substantially on a plane passing along line 6—6 in FIGURE 4;

FIGURE 7 is a cross-sectional detail illustrating the forward portion of the apparatus in its retracted position prior to a piercing of the pipe wall;

FIGURES 8A through 8E illustrate the sequence followed in forming the controlled size orifice by the piercing tool;

FIGURE 9 illustrates a pipe section incorporating the orifice of the instant invention therein in conjunction with an orifice protecting recess within the pipe wall surrounding the orifice;

FIGURES 10 and 11 illustrate cross-sectional details of the pipe section of FIGURE 9 taken on the appropriate section lines;

FIGURE 12 illustrates a further form of protected orifice; and

FIGURES 13 and 14 illustrate sectional details of the protected orifice of FIGURE 12 taken on appropriate section lines.

Referring now more specifically to the drawings, reference numeral 20 is used to generally designate the apparatus comprising the instant invention. This apparatus 20 includes an enlarged sheave or sheave-like member 22 which acts as a holder or carrier for the plastic pipe 24 within which the orifices are to be formed. The sheave 22 includes an outer annular rim 26 having a pipe-nesting recess 28 therein, a plurality of radial spokes 30, and a central hub 32. The central hub of the sheave 22 is fixed to an elongated shaft 34 rotatably mounted within a supporting base 36. The shaft 34, and consequently the sheave 22, is driven by means of an enlarged sprocket wheel 38 fixed to the shaft below the sheave and operatively engaged with a suitable power source, such as an electric motor (not shown), through a drive chain 40.

The pipe 24, made of a semirigid plastic capable of being cold formed, is carried along a portion of the outer periphery of the sheave rim 26, the pipe nesting within the rim groove 28 and being maintained snugly thereagainst by a series of freely rotating backup rollers 42 mounted on shafts 44 fixed to and projecting upwardly from a flat mounting plate 46 which is in turn mounted in spaced relation above the base 36. Each of the backup rollers 42 also includes a peripheral groove 47 complementing the pipe 24 so as to assist in the stabilization of the pipe 24 during the orifice forming operation as shall be described presently. FIGURE 1 is of particular significance in illustrating the manner in which the pipe 24 is fed into the apparatus 20 between the carrying sheave 22 and the backup rollers 42, it being contemplated that a small amount of tension be maintained on the exiting end of the pipe 24 so as to maintain the pipe snugly against the sheave 22, this being easily effected in any suitable manner, such as by means of a take-up reel.

As the pipe 24 enters the apparatus between the sheave 22 and the backup rollers 42, the portion of the pipe wall immediately adjacent the sheave is punctured and the desired orifice 48 formed therein. This is accomplished by means of an orifice forming tool or unit 50 mounted between adjacent ones of the sheave spokes 30. Any number of such units 50 may be provided at equally spaced points about the sheave so as to sequentially engage and perforate the pipe 24 as it moves through the apparatus 20. It will be noted that three such units 50 have been illustrated in connection with the specific form of the instant invention shown in the drawings.

Each of the units 50 includes an elongated shaft 52 radially orientated and supported for radial reciprocation within a pair of bearing sleeves 54 and 56 which are in turn rigidly mounted between the adjoining sheave spokes 30 by cross mounting bars 57 welded or otherwise fastened to the spokes 30. The shaft 52 is rotatably driven by means of an enlarged friction wheel 58 mounted thereon forward of the rear bearing 54 by means of a pin 60 engaged through a longitudinally elongated slot 62, the friction wheel 58 in turn being spring-loaded by a suitable biasing spring 64 engaged between the forward face of the wheel 58 and a stop collar 66 locked to the shaft 52. In this manner, a smooth rotational driving of the shaft 52 is insured throughout the range of radial reciprocation of the shaft 52 as shall be described presently. The friction wheel 58 is engaged with the lower surface of a flat drive disk 68 rotatably mounted on the main support shaft 34 and driven through an enlarged pulley or sprocket wheel 70 which is in turn remotely driven, through an endless belt or chain 72, from a suitable power source (not illustrated). Accordingly, it will be appreciated that the rotational driving of the shaft 52 of the orifice forming unit 50 is independent of the driving of the carrying sheave 22.

Projecting longitudinally from the forward end of the shaft 52, and constituting a longitudinal continuation thereof, is a mounting arm 74 defined by two laterally spaced elongated arm portions 76. Received between the arm portions 76, and pivotally engaged with the forward ends thereof, as at 78, for swinging movement from a position generally paralleling the arm portions 76 and a position outwardly angled therefrom, is a positioning arm 80 which in turn also consists of a pair of laterally spaced arm portions 82. Mounted between the rear or inner ends of the arm portions 82, by means of a rubber mount or bushing 84, is an elongated forwardly projecting rod 86 which has the orifice forming pin or tool 88 either permanently or replaceably mounted on the forward end thereof. The rubber mount 84 allows for a relative movement between the positioning arm 80 and the pin mounting rod 86 for reasons which shall subsequently become apparent.

The angular displacement of the positioning arm 80 is effected by an elongated control arm 90 which parallels the mounting arm 74 in laterally spaced relation therefrom. The forward end of the control arm 90 includes a laterally directed portion defining a pair of laterally spaced ears 92 which are pivotally engaged, through pin means 94, with a pair of depending ears 96 on the slant arm 80. The rear or inner end of the control arm 90 is in turn pivotally engaged for limited movement to a mounting collar 98 which is itself fixed to a sleeve 100 slidably mounted on the rotatable shaft 52. In this manner, as the control arm 90 is moved forwardly, pressure on the positioning arm 80 through the pin connection 94 will effect a pivotal rotation of the arm 80 about the pivotal engagement 78 of the arm 80 with the mounting arm 74. By the same token, upon a retraction of the arm 90, the control arm 80 will pivot back into received position between the portions 76 of the arm 74, this return movement of the positioning arm 80 being limited by engagement of the inner end thereof with a suitable stop 102.

In order to effect the forward movement of the control arm 90 and the angular displacement of the positioning arm 80, an enlarged thrust bearing 104 is mounted on the sleeve 100, the outer race of this bearing 104 being stabilized relative to an adjacent spoke by a stabilizing bar 106 pivotally fixed to the spoke and engaged with a portion of the bearing housing through a suitable lost motion connection capable of enabling a reciprocal movement of the bearing 104 both with the shaft 52 and relative thereto.

Mounted rearwardly of the thrust bearing 104, and including a central enlarged aperture therethrough for the free reception of the shaft 52, is a vertically enlarged force transmitting plate 108. This plate 108 is adjustably fixed relative to the thrust bearing 104 by a pair of adjusting bolts 110 engaged between the plate 108 and oppositely directed ears 113 on the bearing 104. In this manner, slight adjustments can be made in the relative positions of the bearing 104 and plate 108. The lower end of the plate 108 is rigidly affixed to a horizontal plate 112 which in turn mounts, in free rolling relationship therebelow, a horizontally orientated cam follower or roller 114. An elongated tension spring 116 is engaged between the horizontal plate 112 and a depending lug 117 on the shaft bearing 56 immediately therebehind so as to retain the follower 114 snugly against the cam or camming wall 118 fixed to the mounting plate 46 along the path of travel of the cam follower 114 during the rotation of the carrier sheave 22.

An enlarged coiled compression spring 120 is positioned about the forward end of the shaft 52 and engaged between the control arm collar 98 and a second stop collar 122 fixed on the extreme forward end of the shaft 52 immediately behind the mounting arm 74. The rigidity in the spring 120 is such so as to, upon the introduction of a forward thrust on the control arm mounting sleeve 100, effect a direct transmission of this force to the forward stop collar 122 in a manner which produces a forward movement of the shaft 52 itself and a piercing of the pipe 24 by the pin tool 88. Incidently, it will of course be appreciated that the sheave rim 26 includes a suitable aperture 124 therein for the reception of the pipe piercing pin 88 therethrough. The forward movement of the shaft 52, in conjunction with the elements mounted thereon, is halted by engagement of the enlarged head 126 on the inner end of the shaft 52 with the rear bearing sleeve 54 after which a continued forward thrust on the bearing 104, and consequently control arm 90, effects the aforedescribed outward pivoting of the positioning arm 80. This outward pivoting of the positioning arm 80 also results in an outward pivoting of the pin mounting rod 86. However, in light of the engagement of the pin tool within the pipe, the rod 86 will tend to pivot within the punctured pipe wall, and thereby assume a slightly different annular relationship, this being provided for by the rubber mount 84.

During this sequence of steps the rod 52, and consequently the control arm 90, mounting arm 74, positioning arm 80, mounting rod 86 and pin tool 88 have been continuously rotating, this rotation facilitating a smooth initial puncturing of the pipe wall.

The actual sequence, with regard to the pin 88 itself, is illustrated in FIGS. 8A through 8D wherein it will be noted that the pin 88 is initially introduced perpendicularly through the wall of the pipe 24 while the pin 88 is being rotated. Next, the pin 88, through the mounting rod 86, is angularly orientated to a degree which stresses the plastic material of the pipe 24 beyond its elastic limit, thereby providing for a permanent deformation of the material. Meanwhile, the shaft 52 continues to rotate about its axis which is now at an angle to the axis of the pin 88, the pin 88 continuing to rotate about the axis of the shaft 52. In this manner, a rolling of the pin 88 occurs in a manner which produces an outward deformation of the orifice equally on both sides of the center of the pipe wall so as to form a pair of opposed conical portions terminating at a circular central zone 130 which defines the size of the orifice 48 and determines the amount of flow which can be accommodated thereby. It will be appreciated that this central zone 130 is substantially equal to the diameter of the pin 88 itself which pivots at this point as the mounting rod 86 therefor moves angularly outward under the influence of the control arm 90. The orifice 48 produced in this manner, that is through a cold forming of the sides thereof, incorporates a conically enlarged entrance and exit with the cold formed material being compressed outwardly so as to form a rigidified boundary 132 about the orifice in a manner which precludes any undesirable deformation of the orifice under the influence of the water flowing therethrough. By the same token, the formation of the orifice in this manner insures an exact control of the size thereof as compared to the more conventional ways heretofore utilized in forming holes in pipes of this type.

As noted supra, the initial actuation of the pipe piercing and orifice forming unit is effected by engagement of the cam following wheel 114 with the elongated camming wall 118 fixed to the mounting plate 46 below the sheave. This mounting wall 118, referring to FIG. 1, extends along a substantial portion of the pipe receiving periphery of the sheave and is so orientated as to commence a forward movement of the rotating shaft 52 immediately subsequent to the initial engagement of the section of the pipe 24 to be perforated. As described previously, the continuous forward camming of the follower 114 continues until the pin 88 is engaged through the pipe, angularly displaced about a pivot point centrally within the pierced portion of the pipe wall, and rotated several times, in its angularly displaced position, about the axis of the shaft 52 so as to achieve a permanent deformation of the orifice sides. The camming wall 118 then gradually retracts or fades away so as to allow for a smooth withdrawal of the cam follower 114 which results in a return of the pin tool 88 to a position coaxial with the shaft 52 and a subsequent retraction of the shaft 52 so as to completely withdraw the pin 88 from the pipe 24 just before it leaves the apparatus 20. In achieving the withdrawal of the pin 88, it will be appreciated that as the pressure on the thrust bearing 104 is initially released, the compression spring 120 will move the control arm 90 rearwardly so as to inwardly pivot the positioning arm 80 into engagement with the stop 102. At this point, further rearward movement of the thrust bearing 104, through a rearward biasing of the force transmitting follower mounting plate 108 by the spring 116, will result in a retraction of the entire shaft 52 and a movement of the limiting head 126 away from the rear bearing sleeve 54.

The instant invention also contemplates the provision of various protective features in association with each of the fluid passing apertures 48. For example, in one embodiment, referring to FIGS. 9–11, the wall of the pipe 24 about the orifice 48 itself is to be recessed, as at 134, such a recess being of assistance in providing for an exclusion of dirt from the orifice in subsurface installations. While not specifically illustrated in the drawings, it is contemplated that these recesses be provided in the pipe 24 itself prior to the perforation thereof, this being effected by the engagement of the wall of the pipe with, as an example, a round-ended rod of about ⅛″ in diameter. With reference to FIGS. 4 and 7, it will be noted that the pipe 24 has in fact been illustrated with such a recess formed therein.

FIG. 12 illustrates yet a further manner of providing for a dirt excluding orifice construction. In this instance, the orifice is both surrounded by the afore described recess 134 and a suitable flow permitting mesh or web 136 overlying the recess 134 and permanently affixed to the pipe 24 by a suitable taping strip 138 spanning the mesh covered recess in one direction and loosely retaining the mesh 136. In this manner, water is free to flow out of the orifice and laterally through the mesh 136 between the pipe and loosely positioned retaining tape 138. This construction may alternately be described as comprising a retaining tape overlying the recess in spaced relation thereabove with the space therebetween being filled by a flow permitting and dirt excluding mesh.

From the foregoing, it should be appreciated that a unique apparatus has been devised for effecting the provision of constant size flow permitting orifices within irrigation pipes in a unique manner contemplated to provide proper orifices in thin wall members through a cold forming of the material of the member with the produced orifice in itself being unique in construction and particularly adaptable for ensuring the constant and exact flow characteristics desired in extensive irrigation systems using irrigation pipe of the type involved herein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. Apparatus for forming orifices within elongated lengths of pipe comprising a moving pipe carrier receiving said pipe and conveying said pipe through said apparatus, a perforating unit associated with said carrier, said unit including an orifice forming tool, means for rotatably driving said tool, means for selectively axially extending and retracting said tool through a portion of the pipe within which the orifice is to be formed concurrently with the rotation of said tool, and means for angularly orientating said tool, subsequent to the extension thereof through a portion of the pipe, while maintaining the rotation of the tool about an axis coincident with the axis of the tool prior to the extension thereof so as to effect an outward forming of at least a section of said portion of the pipe receiving the tool therethrough.

2. Apparatus for forming orifices within an elongated member comprising an enlarged carrier, means rotatably mounting and driving said carrier, means on said carrier for receiving a portion of said member and conveying said portion through said apparatus, elongated shaft means mounted on said carrier for rotation and longitudinal extension and retraction relative to the received portion of the member, a member piercing tool, means mounting said tool on the forward end of said shaft means for movement between a first portion substantially coaxial with said shaft means and a second position angularly related to and intersecting the longitudinal axis of said shaft means, means rotatably driving said shaft means and the tool thereon about the longitudinal axis of the shaft means, means for effecting an axial extension of the shaft means and tool so as to pierce the member with the tool, and means for translating the axially extending movement of the shaft means into an angular movement of the tool subsequent to a piercing of the member while retaining the rotational driving of the shaft means and tool about the longitudinal axis of the shaft means.

3. The apparatus of claim 2 wherein the means for effecting an axial extension of the shaft means and tool is operative in response to a rotation of the carrier for both extending said shaft means and tool and subsequently retracting said shaft means and tool.

4. The apparatus of claim 3 wherein the means mounting said tool comprises arm means pivoted to the forward end of said shaft means and projecting rearwardly therefrom along said shaft means, and tool holding means pivotally engaged with the rear end of said arm means and projecting forwardly therefrom along said arm means, said tool being mounted on the forward end of said holding means and projecting forwardly beyond the forward end of said shaft means.

5. The apparatus of claim 4 wherein said means for translating the axial movement of the shaft means into an angular movement of the tool comprises an elongated control arm paralleling said shaft means, means engaging the forward end of the control arm with the arm means at a point laterally outward of the point of pivotal engagement of the arm means with the forward end of the shaft means whereby a forward movement of the control arm relative to the shaft will effect an outward pivoting of the control arm, means slidably engaging the rear end of the control arm with the shaft means for movement relative thereto, and means preventing independent forward movement of the control arm relative to the shaft means prior to a predetermined initial extension of the shaft means.

6. The apparatus of claim 5 wherein the means for effecting an axial extension of the shaft means comprises a cam guided thrust member engaged against the means slidably engaging the rear end of the control arm with the shaft means, said means preventing independent forward movement of the control arm comprising a compression spring engaged between the control arm means slidably engaging the shaft means and a fixed abutment on the shaft means forward thereof, said means for translating axial movement of said shaft means into angular movement of said tool including a limit means on said shaft means preventing forward movement of the shaft means beyond a predetermined point while allowing for a compression of the spring and a continued forward movement of the control arm.

References Cited

UNITED STATES PATENTS

| | | |
|---|---|---|
| 1,408,877 | 3/1922 | Funk. |
| 2,075,038 | 3/1937 | Hutchinson. |
| 2,181,959 | 12/1939 | Arborio. |
| 2,697,264 | 12/1954 | Queberg. |
| 2,822,599 | 2/1958 | Webb. |
| 2,834,983 | 5/1958 | Norton. |
| 3,183,571 | 5/1965 | Schmunk et al. |

WILLIAM J. STEPHENSON, *Primary Examiner.*